US012681670B2

(12) United States Patent
Ota

(10) Patent No.: US 12,681,670 B2
(45) Date of Patent: Jul. 14, 2026

(54) IMAGE PROCESSING APPARATUS, IMAGE PROCESSING SYSTEM, NON-TRANSITORY COMPUTER READABLE MEDIUM, AND IMAGE PROCESSING METHOD

(71) Applicant: FUJIFILM Business Innovation Corp., Tokyo (JP)

(72) Inventor: Takuya Ota, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/183,977

(22) Filed: Mar. 15, 2023

(65) Prior Publication Data

US 2024/0086120 A1 Mar. 14, 2024

(30) Foreign Application Priority Data

Sep. 12, 2022 (JP) ................................. 2022-144825

(51) Int. Cl.
*G06F 3/12* (2006.01)
(52) U.S. Cl.
CPC .......... *G06F 3/1208* (2013.01); *G06F 3/1205* (2013.01); *G06F 3/1263* (2013.01)
(58) Field of Classification Search
None
See application file for complete search history.

(56) References Cited

U.S. PATENT DOCUMENTS

| | | | |
|---|---|---|---|
| 5,850,584 A | 12/1998 | Robinson et al. | |
| 11,709,590 B2 * | 7/2023 | Hayamizu | A61B 1/05 715/771 |
| 2012/0213487 A1 * | 8/2012 | Kamotani | H04N 1/00442 386/230 |
| 2015/0212457 A1 * | 7/2015 | Kanno | G03G 15/1665 399/66 |
| 2022/0407988 A1 * | 12/2022 | Chou | G01N 21/8483 |
| 2024/0086120 A1 * | 3/2024 | Ota | G06F 3/1263 |

FOREIGN PATENT DOCUMENTS

| | | |
|---|---|---|
| JP | 2000-003263 A | 1/2000 |
| JP | 2015-032262 A | 2/2015 |
| JP | 2018-196114 A | 12/2018 |
| JP | 2021-140265 A | 9/2021 |

OTHER PUBLICATIONS

May 12, 2026 Office Action issued in Japanese Patent Application No. 2022-144825.

* cited by examiner

*Primary Examiner* — Darryl V Dottin
(74) *Attorney, Agent, or Firm* — Oliff PLC

(57) ABSTRACT

An image processing apparatus includes a processor configured to: obtain a print job having multiple objects; receive an allowable time for image-quality adjustment on at least one object included in the print job; and present at least one object which is allowed to be processed within the time if the objects included in the print job are processed in a predetermined order of priority.

12 Claims, 7 Drawing Sheets

FIG. 6

AREA IN WHICH GRADATION
CORRECTION EFFECT IS EXPECTED

AREA IN WHICH GRADATION
CORRECTION IS PERFORMED
(ENTIRE OBJECT)

AREA IN WHICH GRADATION
CORRECTION EFFECT IS EXPECTED
(ONLY HIGHLIGHTED PORTION)

FIG. 9

| OBJECT | TYPE | COORDINATES | SIZE | CORRECTION | PROCESSING TIME | EFFECT |
|---|---|---|---|---|---|---|
| 0001 | IMAGE | 10, 10 | 20, 50 | SHARPNESS | 0. 50 | 1. 0 |
| 0001 | IMAGE | 10, 10 | 20, 50 | EDGE DENSITY CORRECTION | 0. 01 | 0. 0 |
| 0001 | IMAGE | 10, 10 | 20, 50 | GRADATION CORRECTION | 0. 01 | 0. 0 |
| 0002 | SHADED | 30, 50 | 100, 10 | SHARPNESS | 0. 01 | 0. 0 |
| 0002 | SHADED | 30, 50 | 100, 10 | EDGE DENSITY CORRECTION | 0. 30 | 0. 2 |
| 0002 | SHADED | 30, 50 | 100, 10 | GRADATION CORRECTION | 0. 8 | 1. 2 |
| . . | . . | . . | . . | . . | . . | . . |

1

IMAGE PROCESSING APPARATUS, IMAGE PROCESSING SYSTEM, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2022-144825 filed Sep. 12, 2022.

BACKGROUND

(i) Technical Field

The present disclosure relates to an image processing apparatus, an image processing system, a non-transitory computer readable medium, and an image processing method.

(ii) Related Art

In Japanese Unexamined Patent Application Publication No. 2000-003263, the following technique has been proposed. Using raster image processing, a color original image is input to an image processing apparatus of a printer. At least one image processing parameter, which affects the image quality of an output image, in the image processing apparatus is changed. The cost of materials to be consumed is determined on the basis of the change of at least one image processing parameter. An output image is selected on the basis of the cost for the job and a desired image quality.

In Japanese Unexamined Patent Application Publication No. 2018-196114, an image processing apparatus has been proposed. The image processing apparatus includes an image acquisition unit, an image converter, a color feature calculating unit, a cost calculating unit, and an output-condition determining unit. The image acquisition unit acquires input image data. The image converter performs image conversion on the input image data, and generates output image data corresponding to each of multiple output conditions. The color feature calculating unit calculates, from the image data before and after the image conversion, a color feature value which indicates the amount of change in color feature of each pixel. The cost calculating unit calculates cost information indicating the cost of the output image data corresponding to each of the output conditions, on the basis of the output condition and the output image data. The output-condition determining unit refers to the color feature values, the cost information, a weight table, in which weights are set for the items of the output conditions, to calculate costs versus effects, and determines which output condition is to be used in output.

In Japanese Unexamined Patent Application Publication No. 2015-032262, the following technique has been proposed. When a user transmits an instruction to do "Trial printing" on a printer driver, and selects a target page in a document, whether the target page includes drawing objects is analyzed. If drawing objects are included and effective functions are present, multiple recommended print settings are generated as combinations which are highly likely to improve the print quality. A user is made to select a recommended print setting, which is to be used in actual output, from the settings, and trial printing is performed.

Image-quality adjustment on an image may produce an unintended result, for a user, of effect of the image-quality adjustment versus a time required for the image-quality adjustment. In addition, image-quality adjustment, which is performed on all the objects in an image, takes time, and an unnecessary image-quality adjustment for a user may be performed.

In contrast, if a user determines, for each object, whether image-quality adjustment is to be performed on the object, the user takes the trouble in which, every time a job is received, each object in the job is to be checked for whether the object is to be selected.

SUMMARY

Aspects of non-limiting embodiments of the present disclosure relate to an image processing apparatus, an image processing system, a non-transitory computer readable medium, and an image processing method which enable a time required for image-quality adjustment to be decreased compared with the case in which image-quality adjustment is always performed on all objects, and which enable a reduction of a user's trouble for setting of the image-quality adjustment compared with the case in which the user is made to select all the objects that are to be subjected to the image-quality adjustment.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus an image processing apparatus comprising a processor configured to: obtain a print job having a plurality of objects; receive an allowable time for image-quality adjustment on at least one object included in the print job; and present at least one object which is allowed to be processed within the time if the plurality of objects included in the print job are processed in a predetermined order of priority.

BRIEF DESCRIPTION OF THE DRAWINGS

Exemplary embodiment of the present disclosure will be described in detail based on the following figures, wherein:

FIG. 6 is a diagram illustrating another exemplary recommendation for effective image-quality adjustment;

FIG. 9 is a diagram illustrating an example of processing times and effects of image-quality adjustments.

DETAILED DESCRIPTION

Figures 1, 2:
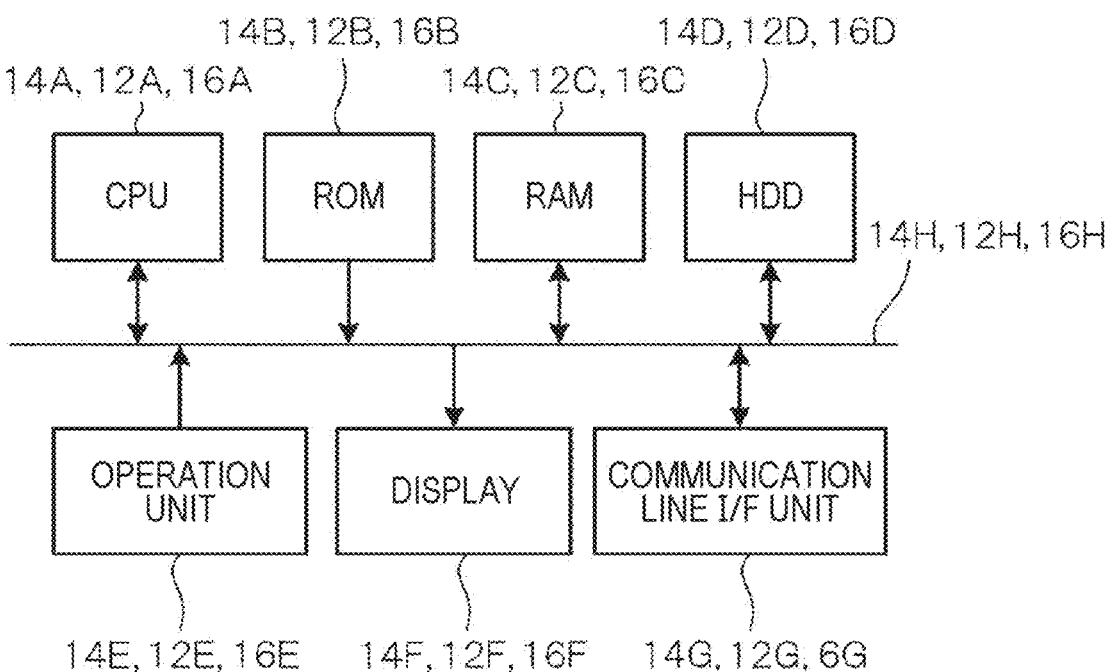
FIG. 1 is a diagram illustrating a schematic configuration of an image processing system according to the present exemplary embodiment.
FIG. 2 is a block diagram illustrating the configuration of electrical components of a process management system, a pre-print processing apparatus, and a printing control apparatus according to the present exemplary embodiment.

An exemplary embodiment of the present disclosure will be described in detail below by referring to the drawings. FIG. 1 is a diagram illustrating a schematic configuration of an image processing system according to the present exemplary embodiment.

An image processing system 10 according to the present exemplary embodiment includes a process management system 12, a pre-print processing apparatus 14 serving as an image processing apparatus, a printing control apparatus 16, and a printer 18. FIG. 1 illustrates one printing control apparatus 16 and one printer 18. However, the number of apparatuses is not limited to one. Multiple pairs of one printing control apparatus 16 and one printer 18 may be included. The printing control apparatus 16 and the printer 18 correspond to an exemplary printing execution apparatus.

The process management system 12 functions as a process management system which manages the process, from taking orders to shipping, on print jobs which are to be printed on the printer 18. A print job refers to a process or a group of processes which is performed by the printer 18 for printing.

The pre-print processing apparatus 14 receives target job data from the process management system 12, and uses the job data to perform pre-print processing. As image-quality adjustment which is an example of the pre-print processing, various types of corrections, such as sharpness correction, red green blue (RGB) photograph corrections (such as texture correction, white balance correction, skin correction, and sky color correction), edge density correction, and gradation correction, are performed.

The printing control apparatus 16 receives job data which has been subjected to pre-print processing, and controls printing based on the job data through control of the printer 18. The printing control apparatus 16 transmits, for example, a processing result and print information to the process management system 12.

The printer 18 performs printing based on job data through control from the printing control apparatus 16. For example, a printer which performs commercial printing is used as the printer 18.

The configuration of the process management system 12, the pre-print processing apparatus 14, and the printing control apparatus 16 will be described. FIG. 2 is a block diagram illustrating the configuration of electrical components of the process management system 12, the pre-print processing apparatus 14, and the printing control apparatus 16 according to the present exemplary embodiment. The process management system 12, the pre-print processing apparatus 14, and the printing control apparatus 16 have a typical computer configuration. Thus, the pre-print processing apparatus 14 will be described below as a typical apparatus, and the process management system 12 and the printing control apparatus 16 will not be described in detail.

As illustrated in FIG. 2, the pre-print processing apparatus 14 according to the present exemplary embodiment includes a central processing unit (CPU) 14A, a read-only memory (ROM) 14B, a random-access memory (RAM) 14C, a hard disk drive (HDD) 14D, an operation unit 14E, a display 14F, and a communication line interface (UF) unit 14G. The CPU 14A controls the operations of the entire pre-print processing apparatus 14. The ROM 14B stores, for example, various control programs and various parameters in advance. The RAM 14C is used, for example, as a work area used when the CPU 14A runs various programs. The HDD 14D stores, for example, various types of data and application programs. The operation unit 14E, which is, for example, a keyboard and a mouse, is used to input various types of information. The operation unit 14E is used to display various types of information. The communication line OF unit 14G, which is connected to various communication lines, receives/transmits various types of data from/to other apparatuses connected to the communication lines. The units of the pre-print processing apparatus 14 described above are electrically connected to each other through a system bus 14H. In the pre-print processing apparatus 14 according to the present exemplary embodiment, the HDD 14D is used as the storage unit. However, the configuration is not limited to this. A different nonvolatile storage unit such as a flash memory may be used.

The configuration described above allows the pre-print processing apparatus 14 according to the present exemplary embodiment to use the CPU 14A to perform the following operations: access to the ROM 14B, the RAM 14C, and the HDD 14D; acquisition of various types of data through the operation unit 14E; and display of various types of information on the operation unit 14E. The pre-print processing apparatus 14 uses the CPU 14A to control reception/transmission of communication data through the communication line OF unit 14G.

Specifically, in the pre-print processing apparatus 14, the CPU 14A obtains a print job having multiple objects, and receives an allowable time for image-quality adjustment of objects included in the print job. The CPU 14A presents objects, which may be processed within the received time under the assumption that the CPU 14A processes, in a predetermined order of priority, multiple objects included in the print job.

Figure 3:
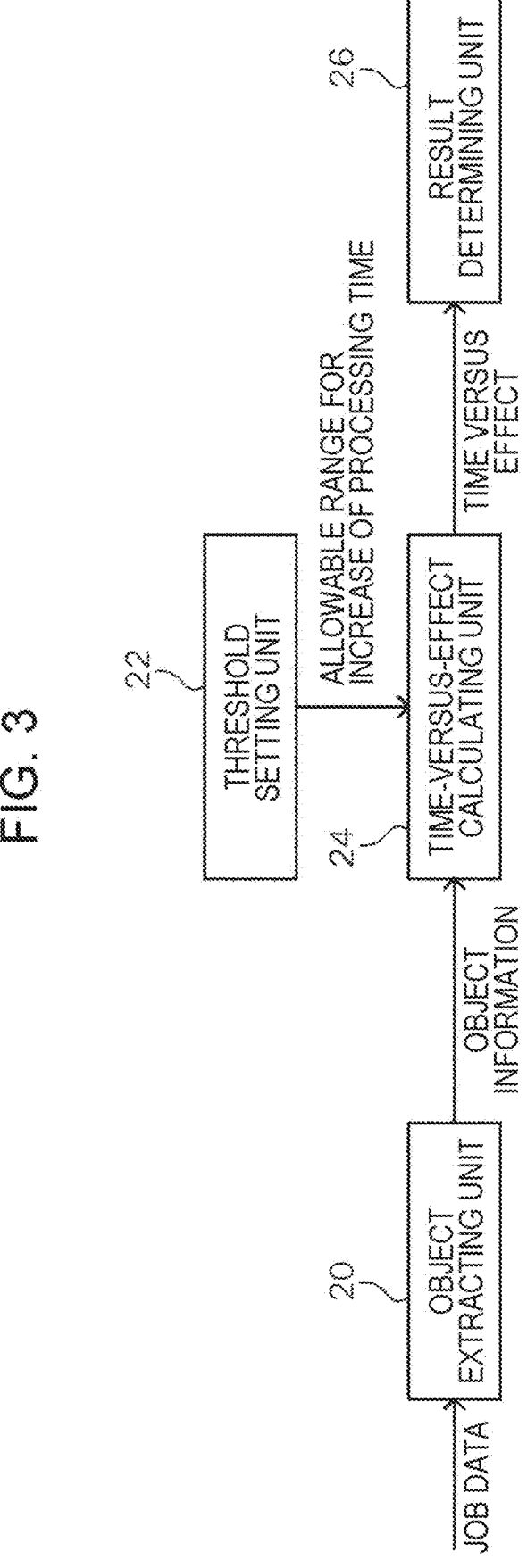
FIG. 3 is a block diagram illustrating the functional configuration of a pre-print processing apparatus according to the present exemplary embodiment.

In the present exemplary embodiment, to perform the process described above, the CPU 14A has the functions, illustrated in FIG. 3, by running information processing programs stored in the ROM 14B or the HDD 14D. FIG. 3 is a block diagram illustrating the functional configuration of the pre-print processing apparatus 14 according to the present exemplary embodiment.

The pre-print processing apparatus 14 according to the present exemplary embodiment has an object extracting unit 20, a threshold setting unit 22, a time-versus-effect calculating unit 24, and a result determining unit 26.

The object extracting unit 20 analyzes job data received from the process management system 12, extracts an object from the job data, and generates object information obtained through classification of the object according to its type and size.

The threshold setting unit 22 sets a user's allowable range for increase of processing time in execution of image-quality adjustment functions. For example, the threshold setting unit 22 receives, from a user, a threshold for the allowable range for increase of processing time, and sets the received threshold.

The time-versus-effect calculating unit 24 calculates a time versus effect by calculating a processing time and an effect for each image-quality adjustment function on the basis of the object information.

The result determining unit 26 compares the time versus effect with the threshold which is set by the threshold setting unit 22, and extracts image-quality adjustment functions from which effect is expected to be produced.

Figure 4:
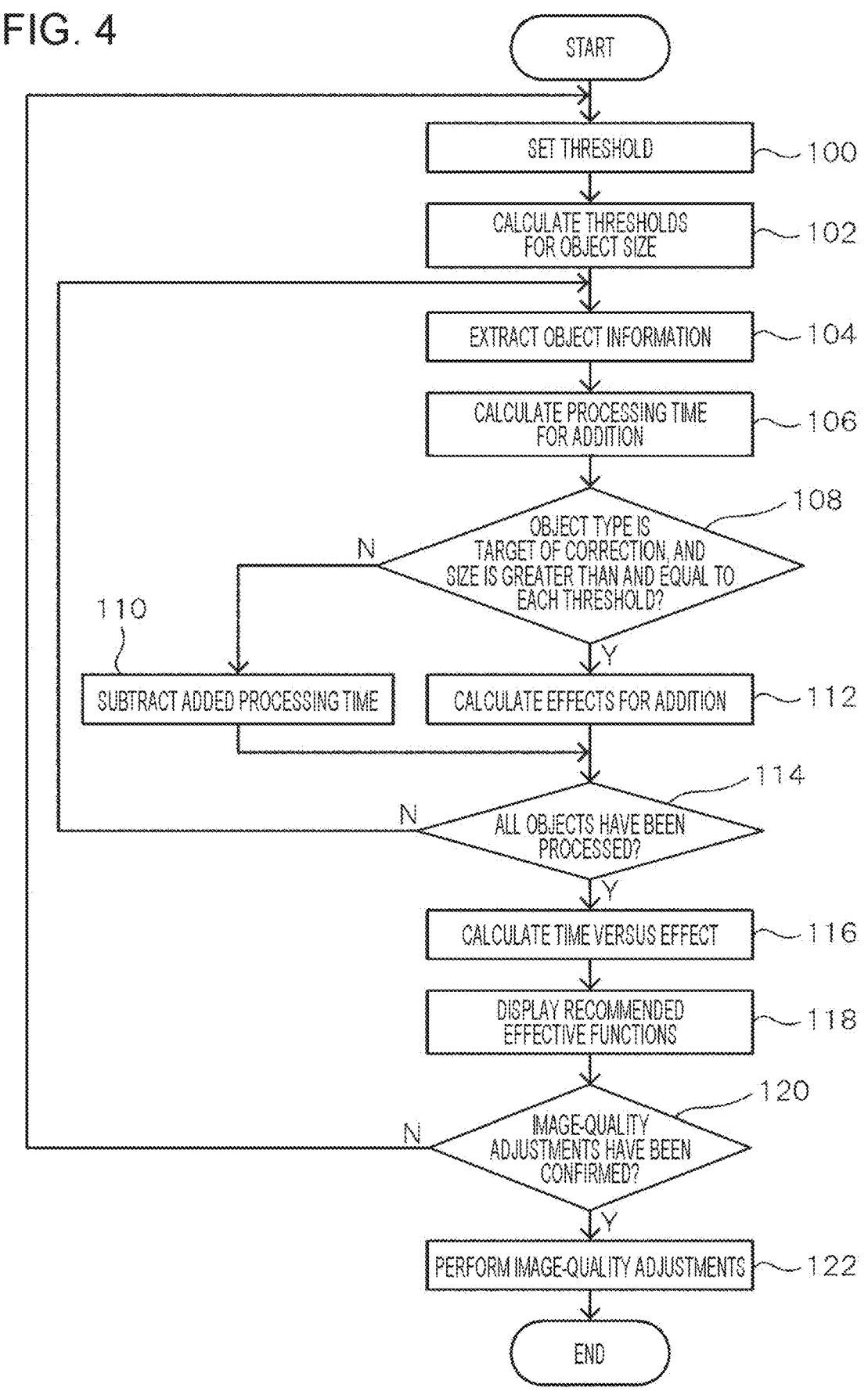
FIG. 4 is a flowchart of an exemplary process performed by a pre-print processing apparatus according to the present exemplary embodiment.

A specific process performed by the pre-print processing apparatus 14 according to the present exemplary embodiment having the configuration described above will be described. FIG. 4 is a flowchart of an exemplary process performed by the pre-print processing apparatus 14 according to the present exemplary embodiment. The process in FIG. 4 starts, for example, when a user transmits an instruction to start to recommend effective image-quality adjustments.

Figure 5:
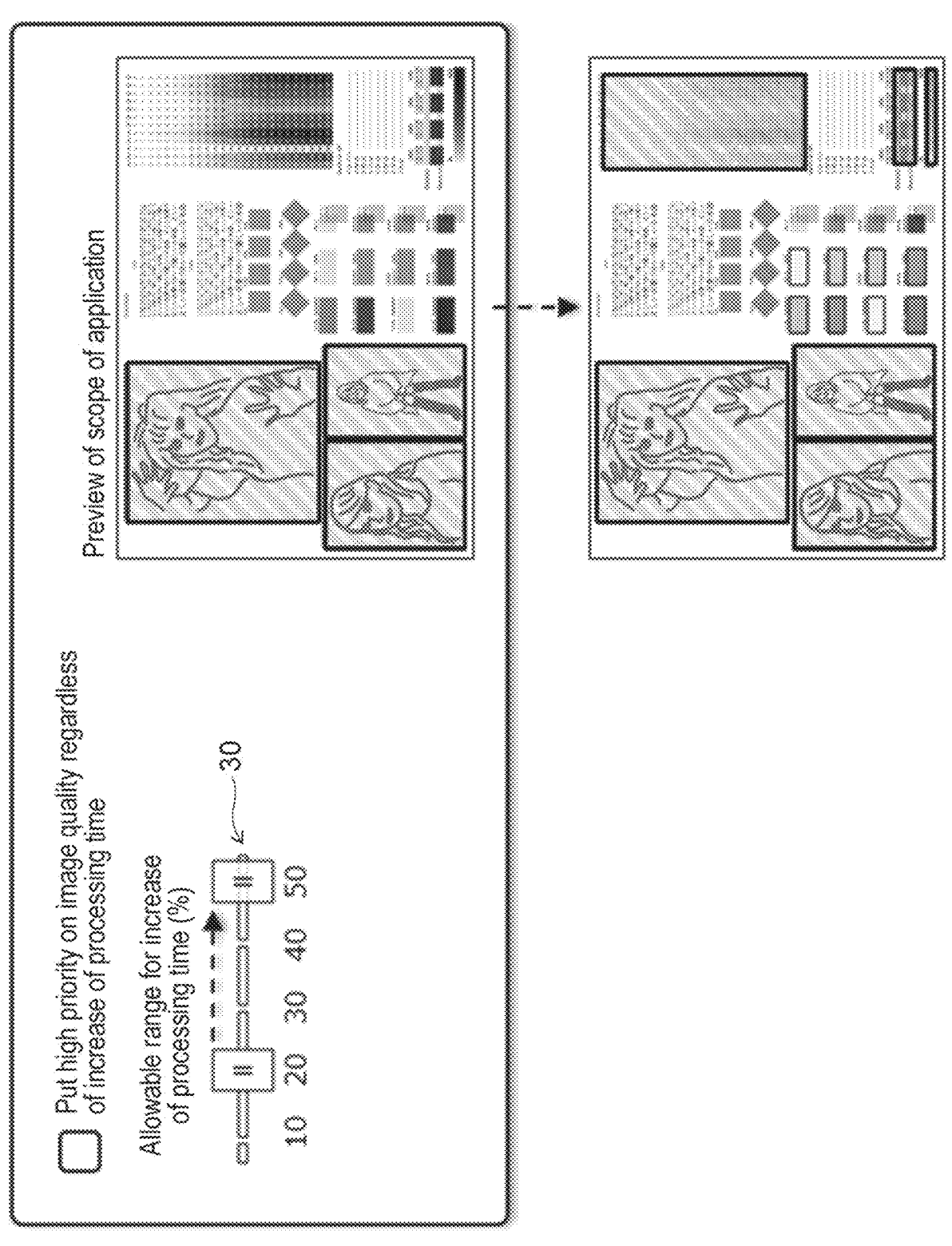
FIG. 5 is a diagram illustrating an exemplary recommendation for effective image-quality adjustment.
Figure 6:
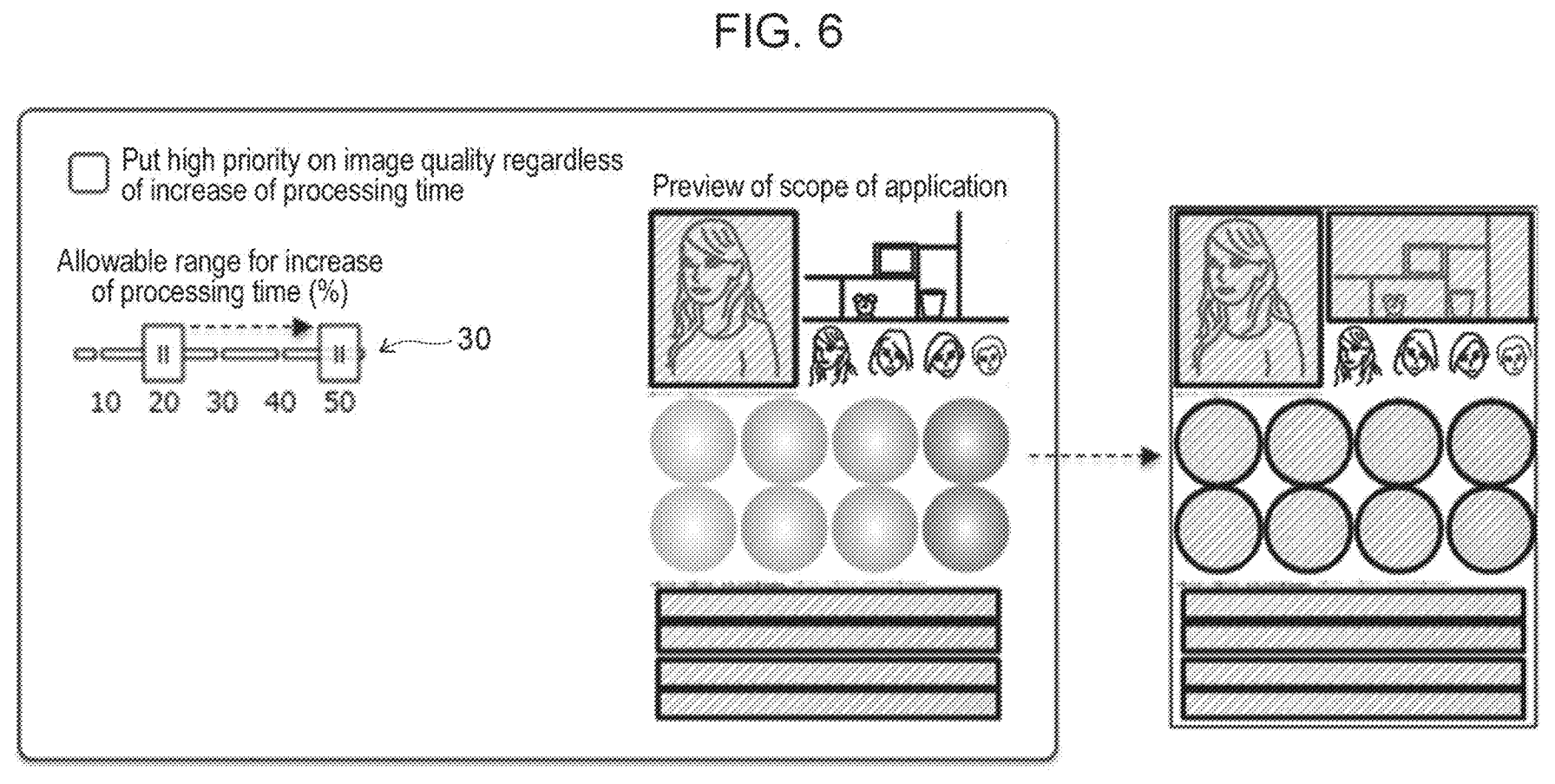

In step 100, the CPU 14A sets a threshold for the allowable range for increase of processing time due to image-quality adjustments, and proceeds to step 102. That is, the threshold setting unit 22 receives, from the user, an allowable range for increase of processing time in execution of image-quality adjustment functions, and sets the allowable range. For example, a screen, as illustrated in FIG. 5 or 6, is displayed, and the user operates a sliding switch 30 for setting the allowable range for increase of processing time. The threshold for the allowable range for increase of processing time due to image-quality adjustments is received and set.

In step 102, the CPU 14A calculates thresholds for object size, and proceeds to step 104. Calculation of the thresholds for object size allows the lower limit of the object size to be set for each image-quality adjustment process. For example, on the basis of experimental values obtained from experiments for checking if an effect from correction is viewable, a threshold for object size is set in advance for each image-quality adjustment process. The area of an object is used for the threshold for size. In addition to the area, a minimum value may be set for the short side.

In step 104, the CPU 14A extracts object information from the job data, and proceeds to step 106. That is, the object extracting unit 20 analyzes the job data received from the process management system 12, extracts an object, and generates object information obtained through classification of the object according to its type and size.

In step 106, the CPU 14A calculates a processing time, which is required for image-quality adjustment, of the extracted object, adds the processing time, and proceeds to step 108. That is, the time-versus-effect calculating unit 24 obtains the total processing time by calculating, for addition, a processing time for each image-quality adjustment function on the basis of the object information.

In step 108, the CPU 14A determines whether the object type is set as a target of correction and whether the size is greater than or equal to each predetermined threshold. If the determination result is negative, the process proceeds to step 110. If the determination result is positive, the process proceeds to step 112.

In step 110, the CPU 14A subtracts the processing time added in step 106, and proceeds to step 114.

Figure 7:
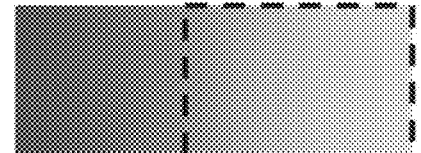
FIG. 7 is a diagram illustrating an exemplary area in which a gradation correction effect is expected.

In contrast, in step 112, the CPU 14A calculates, for addition, the effect of the image-quality adjustment, and proceeds to step 114. That is, the time-versus-effect calculating unit 24 obtains the total of effects by calculating, for addition, the effect of each image-quality adjustment function on the basis of the object information. For example, in calculation of an effect, an expression for calculating an effect score from object information is prepared for each image-quality adjustment process, and an effect is calculated. Specifically, on the basis of experimental values indicating whether a correction effect is viewable, a calculation expression for an effect score is prepared in advance for each image-quality adjustment process. For example, an effect of sharpness is calculated by using the expression, $\alpha \times s$ ($\alpha$=the effect coefficient for sharpness, s=the area of an object (the width×the height)/the page size). An effect of gradation correction is calculated by using an expression, $\beta \times s'$ ($\beta$=the effect coefficient for gradation correction, s'=the area of highlighted portions having a predetermined brightness or greater/the page size). For the predetermined brightness, for example, brightness=0.299×R+G+0.114×B (each of R, G, and B is greater than or equal to 0 and less than or equal to 100). The threshold for brightness is predetermined in the system. However, this setting may be changed. In addition, a highlighted portion has a visual effect of correction which is higher than that of a shadowed portion, and there is a large difference between an effect of gradation correction in a highlighted portion and that in a shadowed portion. Therefore, for a shaded object, the size of a highlighted portion is calculated on the basis of the initial value of the gradation and the amount of its change ($\Delta$), to calculate the area which is illustrated in FIG. 7 and in which a gradation correction effect is expected to be produced.

In step 114, the CPU 14A determines whether all the objects have been processed. If the determination result is negative, the process returns to step 104, and another object is extracted to perform the processes repeatedly. If the determination result is positive, the process proceeds to step 116.

Figure 8:
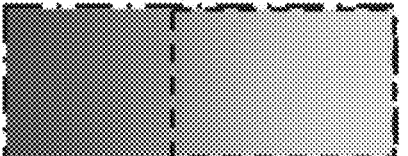
FIG. 8 is a diagram illustrating an area in which gradation correction is performed.

In step 116, the CPU 14A calculates a time versus effect, and proceeds to step 118. That is, the time-versus-effect calculating unit 24 calculates the time versus effect. Specifically, an expression for calculating a processing time from the object information is prepared for each image-quality adjustment process, and the processing time is calculated. The expression for calculating a processing time is prepared in advance for each image-quality adjustment process on the basis of experimental values. A processing time (overhead) for an object that is not a correction target is prepared on the basis of experimental values. For example, the calculation expression for sharpness is an expression, a×S (a=the processing time coefficient for sharpness, S=the area of an object (the width×the height)/the page size). The calculation expression for gradation correction is an expression, b×S' (b=the processing time coefficient for gradation correction, S'=the area of an object (the width×the height)/the page size). In calculation of an effect of gradation correction, an effect score is calculated by using the area of highlighted portions. In contrast, as illustrated in FIG. 8, a correction process is performed, not only on a highlighted portion, but on the entire object. Thus, the processing time is calculated by using the area of an object.

In step 118, the CPU 14A displays recommended effective functions, and proceeds to step 120. That is, the result determining unit 26 compares the time versus effect with the threshold which is set by the threshold setting unit 22, extracts image-quality adjustment functions for which effect is expected to be produced, and presents objects which may be processed within the time.

How to determine which image-quality adjustments are to be recommended, in display of recommended effective functions, will be described.

Processing times and effects of image-quality adjustments on each object are calculated and stored. For example, as illustrated in FIG. 9, processing times and effects of image-quality adjustments on each object are calculated. In addition, the coordinates and the size are stored for a preview described below.

The effects are sorted in descending order. Image-quality adjustments are picked up, as application targets, in descending order of effect in the range up to the allowable value for increase of processing time.

For example, when the allowable range for increase of processing time is 30% and job data has 100 pages, the allowable processing time is 30 (=100×30%).

The image-quality adjustments, which are picked up as application targets until the accumulated processing time reaches 30, are recommended. For example, in the example in FIG. 9, when effects for sharpness and gradation correction are high on the list, edge density correction is not recommended.

Effects are sorted in descending order. Alternatively, the sizes of the objects may be sorted in descending order, and image-quality adjustments may be picked up, as application targets, in descending order of size in the range up to the allowable value for increase of processing time. Alternatively, the processing times may be sorted in descending order, and image-quality adjustments may be picked up, as application targets, in descending order of processing time in the range up to the allowable value for increase of processing time. Alternatively, the types of image-quality adjustments which need processing times may be sorted, and image-quality adjustments may be picked up, as application targets, in an order of the types of image-quality adjustments, which need processing times, in the range up to the allowable value for increase of processing time.

Examples of how to display a recommendation are illustrated in FIGS. 5 and 6: a setting of the allowable range for increase of processing time and a preview of scope of application are displayed. On the basis of the coordinates and size information of a target object, for example, a rectangular image overlies a thumbnail in a print job, which indicates that the object is a correction target. For example, as illustrated by using a hatched portion in FIGS. 5 and 6, display of an object in a different display form indicates that the object is a correction target.

The allowable range for increase of processing time may have an option for putting high priority on image quality without consideration of increase of the processing time. For example, when the checkbox, "Put high priority on image quality regardless of increase of processing time", illustrated in FIGS. 5 and 6 is selected, high priority is put on image quality without consideration of increase of processing time.

In FIGS. 5 and 6, the allowable range is specified, for example, in "%". Alternatively, the allowable range may be specified, for example, in minute or hour.

The determination as to increase of processing time is made on each print job. The processing time estimated in the case where all image-quality adjustments are off is set to one.

FIGS. 5 and 6 illustrate examples in which, when the allowable increase is set to 20%, target objects are selected so that the increase in processing time of a print job is within 20%, and in which previews of scope of application are displayed. On the basis of the processing times and the effects calculated for each object, objects are selected, as application targets, in descending order of time versus effect. In a preview of scope of application, for example, objects, which are to be subjected to image-quality adjustments with the current setting, are displayed in a display form different from that of the other objects, such as coloring a thumbnail in a print job or displaying with hatching, which makes a user easy to recognize the objects. Alternatively, pressing a preview generation button may cause a preview, which illustrates the scope of application, to be displayed. Alternatively, as illustrated in FIGS. 5 and 6, the scope of application may be previewed dynamically with a change of the setting. FIGS. 5 and 6 illustrate exemplary previews of application when the allowable range for increase of processing time is changed from 20% to 50%.

In step 120, the CPU 14A determines whether the image-quality adjustments have been confirmed. In the determination, it is determined whether an instruction to perform printing with the current setting has been transmitted. If the determination result is negative, the process returns to step 100, and the processes described above are repeatedly performed. If the determination result is positive, the process proceeds to step 122.

In step 122, the CPU 14A performs the image-quality adjustments with the current setting, and ends the series of processes. That is, the user checks the preview illustrating application targets, and transmits an instruction to perform the image-quality adjustments. Thus, the pre-print processing apparatus 14 performs the image-quality adjustments which may be performed within the allowable range for increase of processing time, and outputs the print job to the printing control apparatus 16. Thus, the printing control apparatus 16 controls the printer 18 to perform printing on the basis of the job data which has been subjected to the image-quality adjustments.

In the exemplary embodiment, the example, in which the sliding switch 30 is operated to set the allowable range for increase of processing time and to extract objects within the allowable range for increase, is described. However, the configuration is not limited to this. For example, a reserved time for a print job may be set, and objects, which may be processed until the reserved time, may be extracted.

In the embodiment above, a CPU is described as an exemplary processor. The term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The process performed by the pre-print processing apparatus 14 according to the exemplary embodiment may be performed by using software, hardware, or a combination of both. The process performed by the pre-print processing apparatus 14 may be stored as a program in a storage medium for distribution.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image processing apparatus comprising:
a processor configured to:

obtain a print job having a plurality of objects;
receive an allowable time for image-quality adjustment on at least one object included in the print job; and
present at least one object which is allowed to be processed within the time if the plurality of objects included in the print job are processed in a predetermined order of priority.

(((2)))
The image processing apparatus according to (((1))),
wherein the order of priority is descending order of magnitude of effect of the image-quality adjustment, descending order of size of the plurality of objects, descending order of processing time of the image-quality adjustment, or an order of type of the image-quality adjustment which needs a processing time.

(((3)))
The image processing apparatus according to (((1))) or (((2))),
wherein the processor is configured to:
determine a specific operation of the image-quality adjustment performed on each object, calculate a time required for the determined specific operation of the image-quality adjustment, and present the at least one object which is allowed to be processed within the time.

(((4)))
The image processing apparatus according to any one of (((1))) to (((3))),
wherein the processor is configured to:
display a screen for receiving the time, and receive the time on the screen.

(((5)))
The image processing apparatus according to (((4))),
wherein the screen includes a sliding switch that is movable and that is used to set the time.

(((6)))
The image processing apparatus according to (((5))),
wherein the processor is configured to:
change the at least one presented object in accordance with a move of the sliding switch.

(((7)))
The image processing apparatus according to any one of (((1))) to (((6))),
wherein the processor is configured to:
display, in a display format, the at least one object that is allowed to be processed in the time, the display format being different from a display format of another object.

(((8)))
The image processing apparatus according to any one of (((1))) to (((7))),
wherein the processor is configured to:
receive, as the time, a reserved time for printing.

(((9)))
The image processing apparatus according to any one of (((1))) to (((8))),
wherein the processor is configured to:
perform the image-quality adjustment on the at least one presented object which is allowed to be processed in the time, and transmit an instruction to perform printing using the print job.

(((10)))
An image processing system comprising:
the image processing apparatus according to (((9))); and
a printing execution apparatus that performs printing of the print job in response to the instruction from the image processing apparatus.

(((11)))
An image processing program causing a computer to execute a process comprising:
obtaining a print job having a plurality of objects;
receiving an allowable time for image-quality adjustment on at least one object included in the print job; and
presenting at least one object which is allowed to be processed within the time if the plurality of objects included in the print job are processed in a predetermined order of priority.

What is claimed is:
1. An image processing apparatus comprising:
a processor configured to:
obtain a print job having a plurality of objects;
receive an allowable time for image-quality adjustment on at least one object included in the print job; and
present at least one object which is allowed to be processed within the time if the plurality of objects included in the print job are processed in a predetermined order of priority.
2. The image processing apparatus according to claim 1, wherein the order of priority is descending order of magnitude of effect of the image-quality adjustment, descending order of size of the plurality of objects, descending order of processing time of the image-quality adjustment, or an order of type of the image-quality adjustment which needs a processing time.
3. The image processing apparatus according to claim 1, wherein the processor is configured to:
determine a specific operation of the image-quality adjustment performed on each object, calculate a time required for the determined specific operation of the image-quality adjustment, and present the at least one object which is allowed to be processed within the time.
4. The image processing apparatus according to claim 1, wherein the processor is configured to:
display a screen for receiving the time, and receive the time on the screen.
5. The image processing apparatus according to claim 4, wherein the screen includes a sliding switch that is movable and that is used to set the time.
6. The image processing apparatus according to claim 5, wherein the processor is configured to:
change the at least one presented object in accordance with a move of the sliding switch.
7. The image processing apparatus according to claim 1, wherein the processor is configured to:
display, in a display format, the at least one object that is allowed to be processed in the time, the display format being different from a display format of another object.
8. The image processing apparatus according to claim 1, wherein the processor is configured to:
receive, as the time, a reserved time for printing.
9. The image processing apparatus according to claim 1, wherein the processor is configured to:
perform the image-quality adjustment on the at least one presented object which is allowed to be processed in the time, and transmit an instruction to perform printing using the print job.
10. An image processing system comprising:
the image processing apparatus according to claim 9; and
a printing execution apparatus that performs printing of the print job in response to the instruction from the image processing apparatus.

11. A non-transitory computer readable medium storing a program causing a computer to execute a process for image processing, the process comprising:

obtaining a print job having a plurality of objects;

receiving an allowable time for image-quality adjustment on at least one object included in the print job; and presenting at least one object which is allowed to be processed within the time if the plurality of objects included in the print job are processed in a predetermined order of priority.

12. An image processing method comprising:

obtaining a print job having a plurality of objects;

receiving an allowable time for image-quality adjustment on at least one object included in the print job; and presenting at least one object which is allowed to be processed within the time if the plurality of objects included in the print job are processed in a predetermined order of priority.

\* \* \* \* \*